US008330861B2

(12) United States Patent
Lee

(10) Patent No.: US 8,330,861 B2
(45) Date of Patent: Dec. 11, 2012

(54) DISPLAY APPARATUS, IMAGE PROCESSING APPARATUS AND METHOD FOR UPGRADING CONTROL PROGRAM THEREOF

(75) Inventor: Sang-Jun Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1583 days.

(21) Appl. No.: 11/808,067

(22) Filed: Jun. 6, 2007

(65) Prior Publication Data

US 2008/0036919 A1 Feb. 14, 2008

(30) Foreign Application Priority Data

Aug. 9, 2006 (KR) .................. 10-2006-0075272

(51) Int. Cl.
*H04N 5/50* (2006.01)
*G06F 9/44* (2006.01)

(52) U.S. Cl. ........ 348/552; 717/168; 717/169; 717/170; 717/172

(58) Field of Classification Search .................. 348/739, 348/552–554, 725; 717/168–172
See application file for complete search history.

(56) References Cited

U.S. PATENT DOCUMENTS

| 6,425,125 | B1* | 7/2002 | Fries et al. ............ 717/168 |
| 6,684,324 | B2* | 1/2004 | Floman et al. ............ 713/1 |
| 7,098,966 | B2* | 8/2006 | Onomatsu et al. ............ 348/714 |
| 7,120,926 | B1 | 10/2006 | Safadi et al. |
| 7,350,205 | B2* | 3/2008 | Ji .............................. 717/172 |
| 7,770,165 | B2* | 8/2010 | Olson et al. ............ 717/168 |
| 2003/0003955 | A1 | 1/2003 | Asai |
| 2005/0182680 | A1* | 8/2005 | Jones et al. ............ 705/15 |
| 2005/0240919 | A1 | 10/2005 | Kim et al. |
| 2008/0005733 | A1* | 1/2008 | Ramachandran et al. .... 717/168 |
| 2008/0059958 | A1* | 3/2008 | Bolanowski ............ 717/168 |
| 2010/0091198 | A1* | 4/2010 | Matsuo ............ 348/734 |

FOREIGN PATENT DOCUMENTS

CN 1387731 A 12/2002
(Continued)

OTHER PUBLICATIONS

Chinese Office Action mailed May 17, 2011.
(Continued)

*Primary Examiner* — Paulos Natnael
(74) *Attorney, Agent, or Firm* — Roylance, Abrams, Berdo & Goodman, LLP

(57) ABSTRACT

Disclosed is a display apparatus, including: an image processing part which processes an image signal; a display part which displays an image corresponding to the image signal; a storing part which stores a control program and update information related to the control program; a communication part which performs a data communication with a portable apparatus that is assessable to an upgrade server; and a controller which controls the image processing part to display the image corresponding to the image signal based on the control program, and controls the communication part to transmit the upgrade information related to the control program stored in the storing part to the upgrade server through the portable apparatus, and to receive an upgraded control program.

24 Claims, 2 Drawing Sheets

FOREIGN PATENT DOCUMENTS

| | | |
|---|---|---|
| CN | 1397037 A | 2/2003 |
| JP | 2006-146495 A | 8/2006 |
| KR | 2003-0034367 A | 5/2003 |
| KR | 2003-0034367 | 9/2003 |
| KR | 10-2004-0022020 A | 3/2004 |
| KR | 10-2004-0036161 A | 4/2004 |
| KR | 10-2004-0037675 A | 5/2004 |
| KR | 10-2005-0028117 A | 3/2005 |
| KR | 10-2005-00050880 A | 6/2005 |
| WO | WO 2006-003538 A | 1/2006 |
| WO | WO 2006-012948 A | 2/2006 |

OTHER PUBLICATIONS

Decision of Rejection, Chinese Patent Application No. 200710126911.9, The State Intellectual Property Office of P.R. China, Feb. 29, 2012, pp. 1-9.

* cited by examiner

DISPLAY APPARATUS, IMAGE PROCESSING APPARATUS AND METHOD FOR UPGRADING CONTROL PROGRAM THEREOF

CROSS-REFERENCE TO RELATED APPLICATIONS

This application claims benefit under 35 U.S.C. §119(a) of Korean Patent Application No. 2006-0075272, filed on Aug. 9, 2006 in the Korean Intellectual Property Office, the entire disclosure of which is hereby incorporated by reference.

BACKGROUND OF THE INVENTION

1. Field of the Invention

The present invention relates to a display apparatus, an image processing apparatus and method for upgrading a control program thereof. More particularly, the present invention relates to a display apparatus, an image processing apparatus, and method for upgrading a control program thereof, which are operated by a control program capable being upgraded.

2. Description of the Related Art

An image processing apparatus or a display apparatus (hereinafter, referred to as "a display apparatus") such as a TV and a set-top box receives an image signal and performs a predetermined process for the received image signal to display a corresponding image. The display apparatus typically includes an image processing part (not shown) and the like. A predetermined computer program (hereinafter, referred to as "a control program") controls the image processing part, and the like, to perform a concerned operation of the display apparatus.

The control program may generally control functions such as power management, communication with an external interface with a user, and the like, as well as image processing. In particular, as the display apparatus has recently included more various and complicated functions, corresponding control programs are developed. However, at the same time, a problem that the control programs have a lot of bugs has occurred. There are reported many cases that a user discovers the bugs in the control programs after purchasing a concerned display apparatus.

If there is a bug in a control program of a display apparatus that a user has purchased, the user must generally visit a concerned after-sale service center, or request a service engineer to visit the after-sale service center to upgrade the control program having the bug. In the case that the user visits the after-sale service center, the display apparatus including the control program having a bug is connected to a portable computer or a portable memory apparatus in which a upgrade control program to upgrade the control program having the bug (hereinafter referred to as "a upgrade control program") is preset. Then, the upgrade control program is provided to the display apparatus, thereby performing an upgrade process for the control program having the bug.

However, such a conventional upgrade method may be inconvenient for a user because the user must visit an after-sale service center, or may be required to pay an additional cost because a service engineer must visit the user.

Accordingly, there is a need for a convenient display apparatus, an image processing apparatus, and method for upgrading a control program which can be convenient to a user so that when upgrading a concerned control program, a user does not need to visit an after-sale service center and/or incur the cost of a service engineer visiting the user.

SUMMARY OF THE INVENTION

Exemplary embodiments of the present invention address the problems and/or disadvantages and provide at least the advantages described below. Accordingly, an aspect of exemplary embodiments of the present invention is to provide a display apparatus, an image processing apparatus and method for upgrading a control program thereof, which can develop the convenience of a user when upgrading a concerned control program.

Another aspect of exemplary embodiments of the present invention is to provide a display apparatus, an image processing apparatus and method for upgrading a control program thereof, which can reduce a cost when upgrading a concerned control program.

Another aspect of exemplary embodiments of the present invention is to provide a display apparatus, an image processing apparatus and method for upgrading a control program thereof, which can allow a user to suitably deal with an error that may occur when a display apparatus is operated.

Other aspects of exemplary embodiments of the present invention can be achieved by providing a display apparatus, comprising an image processing part which processes an image signal, a display part which displays an image corresponding to the image signal, a storing part which stores a control program and update information related to the control program, a communication part which performs a data communication with a portable apparatus that is assessable to an upgrade server, and a controller which controls the image processing part to display the image corresponding to the image signal based on the control program, and controls the communication part to transmit the upgrade information related to the control program stored in the storing part to the upgrade server through the portable apparatus, and to receive an upgraded control program.

According to another aspect of exemplary embodiments of the present invention, the controller upgrades the control program stored in the storing part by replacing it with the upgrade control program.

According to another aspect of exemplary embodiments of the present invention, the display apparatus further comprises a user input part which receives a user input, wherein the controller transmits the upgrade information related to the control program depending on the received user input.

According to another aspect of exemplary embodiments of the present invention, the display apparatus further comprises a menu generating part which generates a menu related to an upgrade of the control program, wherein the controller controls the menu generating part to display the menu on the display part.

According to another aspect of exemplary embodiments of the present invention, if information related to an upgrade state of the control program and explanation of the upgrade control program is received from the upgrade server, the controller controls the menu generating part to display the menu including a first menu item related to the received information.

According to another aspect of exemplary embodiments of the present invention the controller stores state information related to an operation state of the display apparatus in the storing part, and transmits the state information and the upgrade information related to the control program together to the upgrade server.

According to another aspect of exemplary embodiments of the present invention, if result information that analyses the state information is received through the communication part, the controller controls the menu generating part to display the menu further including a second menu item related to the received result information on the display part.

According to another aspect of exemplary embodiments of the present invention, the upgrade information comprises information related to a model name or a serial number of the display apparatus, and information related to the upgrade state of the control program stored in the storing part.

According to another aspect of exemplary embodiments of the present invention, the communication part comprises a USB (Universal Serial Bus) port.

The foregoing and/or other aspects of Exemplary embodiments of the present invention can be also achieved by providing a method of upgrading a control program for a display apparatus comprising a storing part that stores the control program and an upgrade state of the control program, the method comprising checking whether to connect a portable apparatus that is accessible to an upgrade server, to the display apparatus, transmitting upgrade information related to the control program stored in the storing part, from the display apparatus to the upgrade server, through the portable apparatus if the portable apparatus is connected the display apparatus, and receiving an upgrade control program transmitted from the upgrade server to the display apparatus.

According to another aspect of the present invention, the method further comprises upgrading the control program stored in the storing part by replacing it with the upgrade control program.

According to another aspect of exemplary embodiments of the present invention, the method further comprises receiving a user input, wherein the transmitting upgrade information related to the control program is performed according to the received user input.

According to another aspect of exemplary embodiments of the present invention, the method further comprises displaying a menu related to an upgrade of the control program.

According to another aspect of exemplary embodiments of the present invention, if information related to the upgrade state of the control program and explanation of upgraded control program is received from the upgrade server, the displaying the menu comprises displaying the menu including a first menu item related to the received information.

According to another aspect of exemplary embodiments of the present invention, the method further comprises storing state information related to an operation state of the display apparatus in the storing part, wherein the transmitting upgrade information comprises transmitting the state information and the upgrade information related to the control program together to the upgrade server.

According to another aspect of exemplary embodiments of the present invention, the method further comprises receiving result information that analyses the state information from the upgrade server through the communication part, and displaying the menu further including a second menu item related to the received result information on the display part.

According to another aspect of exemplary embodiments of the present invention, the upgrade information comprises information related to a model name or a serial number of the display apparatus, and information related to the upgrade state of the control program stored in the storing part The foregoing and/or other aspects of exemplary embodiments of the present invention can be also achieved by providing an image apparatus, comprising an image processing part which processes an image signal; a display part which displays an image corresponding to the image signal, a storing part which stores a control program and update information related to the control program, a communication part which performs a data communication with a portable apparatus that is accessible to an upgrade server, and a controller which controls the image processing part to display the image corresponding to the image signal based on the control program, and controls the communication part to transmit the upgrade information related to the control program stored in the storing part to the upgrade server through the portable apparatus, and to receive the upgraded control program.

BRIEF DESCRIPTION OF THE DRAWINGS

The above and/or other exemplary features and advantages of certain exemplary embodiments of the present invention will become more apparent and more readily appreciated from the following detailed description of certain embodiments when taken in conjunction with the accompanying drawings, in which.

DETAILED DESCRIPTION OF EXEMPLARY EMBODIMENTS

Figure 1:
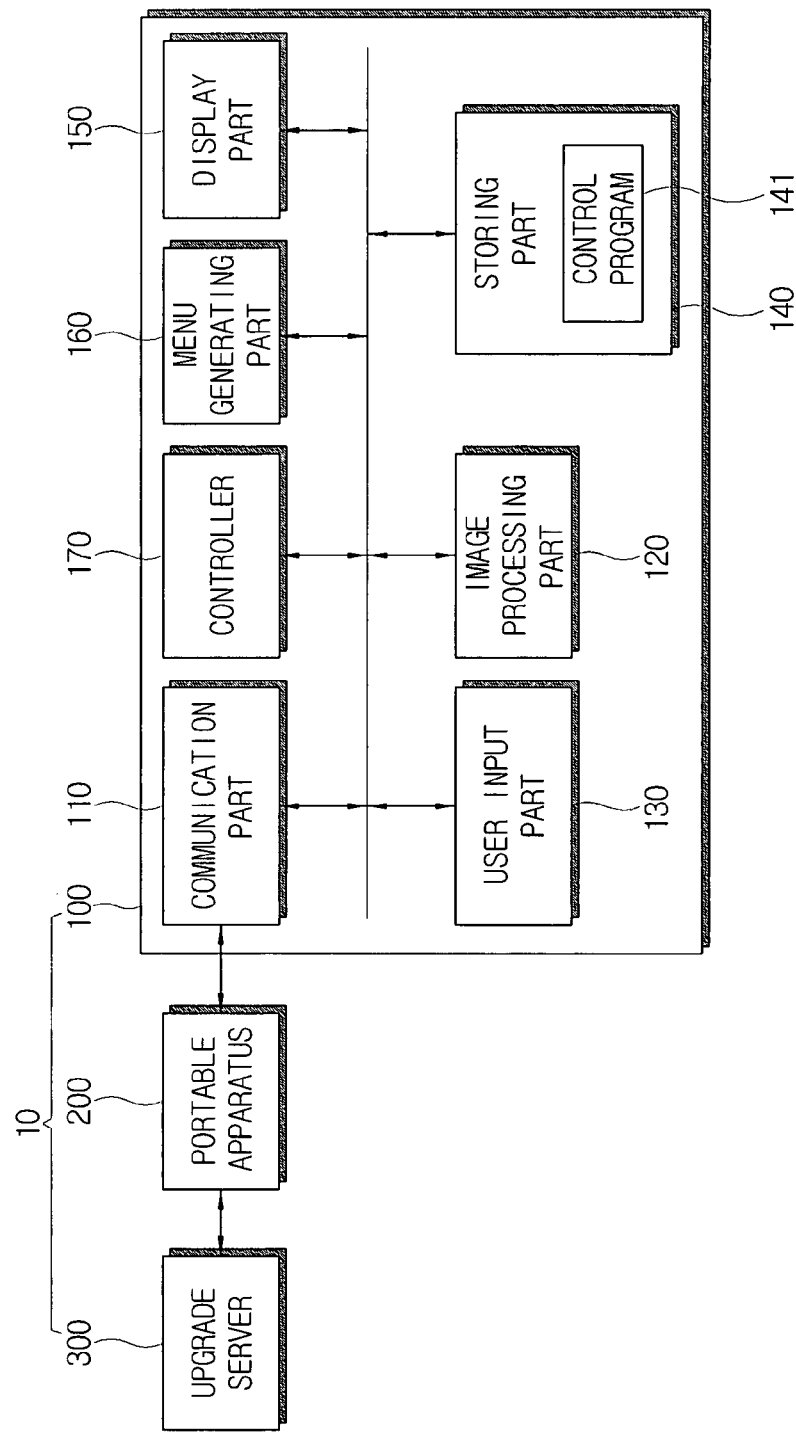
FIG. 1 is a block diagram illustrating a configuration of a display apparatus according to an exemplary embodiment of the present invention.

The matters exemplified in this description are provided to assist in a comprehensive understanding of various exemplary embodiments of the present invention disclosed. Reference will now be made in detail to certain embodiments of the present invention, examples of which are illustrated in the accompanying drawings, wherein like reference numerals refer to like elements throughout. Those of ordinary skill in the art will recognize that various changes and modifications of the exemplary embodiments described herein can be made without departing from the scope and spirit of the claimed invention. Also, descriptions of well-known functions and constructions are omitted for clarity and conciseness.

FIG. 1 is a block diagram illustrating a configuration of a display apparatus 100 according to an exemplary embodiment of the present invention The display apparatus 100 performs a process for a received image signal to display a corresponding image. The display apparatus 100, which may include a TV and the like, is connected to a portable apparatus 200 to upgrade a corresponding control program.

The portable apparatus 200, which may include a mobile phone, a PDA (Personal Digital Assistant), and the like, is connectable to an upgrade server 300 through a wireless communication network.

The upgrade server 100, which may include a web server and the like, stores and controls an upgrade control program of the display apparatus 100. The upgrade server 300 stores the upgrade control program corresponding to a type of the display apparatus 100.

As illustrated in FIG. 1, the display apparatus 100 includes a communication part 110, an image processing part 120, a user input part 130, a storing part 140, a display part 150, a menu generating part 160, and a controller 170. The communication part 110, according to control of the controller, has a data communication with the portable apparatus 200. The communication 110 may includes a USB port (not shown), and have the data communication with the portable apparatus 200 through a USB communication system.

The image processing part 120 performs a process for an image signal inputted from an external according to control of the controller 170. The image signal includes a broadcast signal such as a DTV (Digital Television) signal. At this time, the display apparatus 100 may further include a signal receiving part (not shown). Further, the image signal may include a signal received from a display device such as a DVD (Digital Versatile Disk) player. At this time, the image processing part 120 suitably performs an image process such as decoding for the broadcast signal or the signal received from the display device. In additional, the image processing part 120 may performs an improving operation to improve an image quality, scaling operation to adjust an image size, and the like for the image signal.

The user input part 130 receives a user input for an operation of the display apparatus 100, and transmits the received user input to the controller 170. According to an exemplary implementation, the user input part 130 may include a remote controller and the like.

The storing part 140 stores a control program 141 of the display apparatus 100. The control program 141 as a computer program for an operation of the controller 170 includes information related to a general function of the display apparatus 100. The control program 141 includes a plurality of commands related to the function of the controller 170, and is stored as a source code format in the storing part 140. At this time, the storing part 140 may include a nonvolatile memory such as a flash memory.

The storing part 140 further stores upgrade information related to the control program 141. Here, the upgrade information includes information related to a model name and a serial number of the display apparatus 100, and an upgrade state of the control program 141.

Additionally, the storing part 140 may further store state information related to an operation state of the display apparatus 100. The state information includes information related to an operation error of the display apparatus 100. If an operation error occurs while the display apparatus 100 is operated, state information related to the operation error is stored as a text format in the storing part 140 according to control of the controller 170.

The display part 150, which may include an LCD (Liquid Crystal display) panel, a PDP (Plasma Display Panel), and the like, displays an image corresponding to an image signal processed by the image processing part 120. The menu generating part 160, according to control of the controller 170, generates a menu (not shown) related to an upgrade of the control program 141, and displays the generated menu on the display part 150.

The controller 170 generally controls the display apparatus 100. In particularly, the controller 170 controls the communication part 110, the image processing part 120, the menu generating part 160, and the like based on the control program 141. Herein, the controller 170 includes a processor (not shown) to read out a command in the control program 141 and to perform an operation corresponding to the command, and a RAM (Random Access Memory) (not shown) to temporally store the control program 141 for agile and smooth performance of the operation.

The controller 170 controls the image processing part 120 to display an image corresponding to an image signal inputted from an external based on the control program 141. Further, if the control program 141 is upgraded, the controller 170 controls the communication part 110 to transmit the upgrade information related the control program 141, which is stored in the storing part 140, to the upgrade server 300 through a portable apparatus 200 and to receive an upgrade control program from the upgrade sever 300.

Hereinafter, the display apparatus 100 according to exemplary embodiments of the present invention will be in detail described with reference to FIG. 2.

Figure 2:
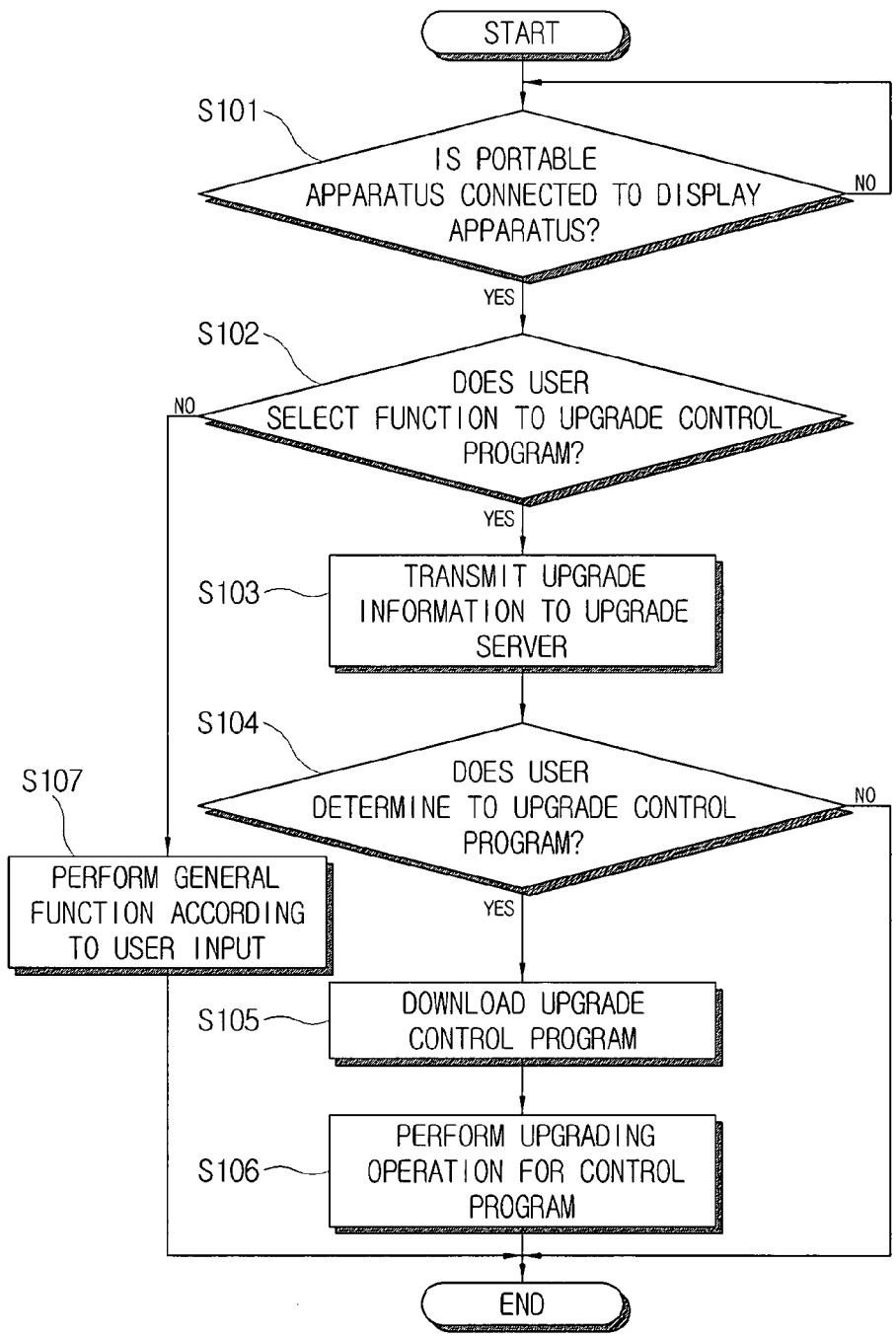
FIG. 2 is a flowchart illustrating a method of upgrading a control program of the display apparatus according to an exemplary embodiment of the present invention.

FIG. 2 is a flowchart illustrating a method of upgrading a control program according to an exemplary embodiment of the present invention.

First, the controller 170 checks whether to connect the portable apparatus 200 to the display apparatus 100 (S101). A user may spontaneously connect the portable apparatus 200 to the display apparatus 100. Alternatively, the user may connect the portable apparatus 200 to the display apparatus 100 because of various reasons.

For example, if an operation error occurs while the display apparatus 100 is operated, the user may think that a control program 141 has a bug and thus the control program 141 is to be upgraded. Alternatively, the user may acquire information related to whether the control program 141 is to be upgraded, through the portable apparatus 200. At this time, the upgrade server 300 corresponds a model name of a purchased display apparatus 100 to a telephone number of a user that purchases the display apparatus 100, and the like, and previously stores the model name and the corresponding telephone number together. Accordingly, when a control program of the upgrade server 300 is upgraded, the upgrade server 300 can inform the user through the portable apparatus 200 that the control program 141 of the purchased display apparatus 100 is to be upgraded through a SMS (Short Message Service), and the like.

As the result of checking it in operation S101, if the portable apparatus 100 is connected to the display apparatus 200, the controller 170 checks whether a user selects a function to upgrade the control program 141 (S102). At this time, the controller 170 may receive a concerned user input through the user input part 103 or from the connected portable apparatus 200.

The controller 170 controls the menu generating part 160 to generate a menu (not shown) related to an upgrade of the control program 141, and displays the generated menu in the display part 150 for a user. For example, it is preferable but not necessary that the generated menu includes a menu item to display "do you want system software to be upgraded?" According to an exemplary implementation, that the generated menu may further include another menu item having a 'Yes' sub-item and a 'No' sub-item that the user can select to determine whether to upgrade the system software.

As the result of checking it in operation S102, if the user does not select the function to upgrade the control program 141, the controller 170 performs a general function such as an image processing control, and the like depending on a user input (S107).

According to an exemplary implementation, if the user selects the function to upgrade the control program 141, the controller 170 controls the communication part 110 to transmit upgrade information stored in the storing part 140 to the upgrade server 300 through the portable apparatus 200 (S103). The portable apparatus 200 is connected to the upgrade server 300 through a network, and transmits the upgrade information received from the display apparatus 100 to the upgrade server 300. An address of the upgrade server 300 such as an URL (Uniform Resource Locator) may be transmitted from the display apparatus 100 to the portable apparatus 200. At this time, an address of a concerned upgrade server 300 may be preset in the storing part 140 when the display apparatus 100 is manufactured.

Then, if the upgrade server 300 receives the upgrade information from the portable apparatus 100, the upgrade server 300 transmits information related to an upgrade state of the control program 141 and explanation of a corresponding upgrade control program to the portable apparatus 200 with reference to a concerned model name, and so on. Then, if the display apparatus 100 receives the information related to the upgrade state of the control program 141 and the explanation of the upgrade control program from the portable apparatus 200, the controller 170 controls the menu generating part 160 so that the generated menu can include the received information.

Then, the controller 170 checks whether the user determines to upgrade the control program 141 (S104). According to an exemplary implementation, the controller 170 controls the menu generating part 160 so that the generated menu can further include a menu item to determine whether to upgrade the control program 141. As the result of checking it, if the user does not determine to upgrade the control program 141, the controller 170 stops an upgrading operation of the control program 141.

If the user determines to upgrade the control program 141, the controller 170 controls the communication part 110 to transmit a user determination of upgrading the control program 141 to the portable apparatus 200. On the other hand, if the upgrade server 300 receives the user determination through concerned information received from the portable apparatus 200, the upgrade server 300 transmits a new-version of the upgrades control program to the portable computer 200.

Then, the controller 170 controls the communication part 110 to download the new version of the upgrade control program from the portable computer 200 (S105). Then, the controller 170 upgrades the control program 141 by replacing the stored control program with the downloaded new version of the upgrade control program (S106).

On the other hand, in operation S103, the controller 170 may control the communication part 110 to transmit state information and the upgrade information, which are stored in the storing part 140, together to the upgrade server 300. At this time, if the state information and the upgrade information are received from the portable apparatus 200, the upgrade server 300 may recognize the reason why the display apparatus 100 is abnormally operated by analyzing the state information, and transmit resulting information related to the recognized reason to the portable computer 200. For example, if an old lamp equipped in the display apparatus 100 is almost used up, the result information may include a suggestion of replacing the old lamp with a new lamp. At this time, if the result information is received from the portable computer 200, the controller 170 controls the menu generating part 160 so that the result information can be displayed on the display part 150 and thus the user can suitably deal with a problem of the display apparatus 100.

As apparent from the above description, the present invention can develop the convenience of a user and reduce a concerned after-sale service cost when upgrading a concerned control program.

For example, certain embodiments of the present invention can reduce the concerned after-sale service cost by downloading a new control program from a corresponding server through a user's portable apparatus instead of a user's directly visiting an after-sale service center to update a control program.

For example, certain embodiments of the present invention can inexpensively upgrade the control program by using an USB port provided in a general display apparatus and the user's portable apparatus.

In addition, if the display apparatus is abnormally operated, exemplary implementations of the present invention may inform the user of a reason why the display apparatus is abnormally operated so that the user can suitably deal with a problem of the display apparatus.

Certain exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains. The described hardware devices may be configured to act as one or more software modules in order to perform the operations of the above-described exemplary embodiments of the present invention.

Although exemplary embodiments of the present invention have been shown and described, it will be appreciated by those skilled in the art that changes may be made in these embodiments without departing from the scope of the present invention. Therefore, the present invention is not limited to the above-described embodiments, but is defined by the following claims, along with their full scope of equivalents.

What is claimed is:

1. A display apparatus, comprising:
    an image processing part which processes an image signal;
    a display part which displays an image corresponding to the image signal;
    a storing part which stores a control program and update information related to the control program;
    a communication part which performs a data communication with a portable communication apparatus that is accessible to an upgrade server; and
    a controller which controls the image processing part to display the image corresponding to the image signal based on the control program, and controls the communication part to transmit the upgrade information related to the control program stored in the storing part to the upgrade server through the portable communication apparatus, and to receive an upgraded control program through the portable communication apparatus.

2. The display apparatus according to claim 1, wherein the controller upgrades the control program stored in the storing part.

3. The display apparatus according to claim 2, wherein the controller replaces the control program stored in the storing part with the upgrade control program to upgrade the stored control program.

4. The display apparatus according to claim 1, further comprising a user input part which receives a user input,
    wherein the controller transmits the upgrade information related to the control program depending on the received user input.

5. The display apparatus according to claim 1, further comprising a menu generating part which generates a menu related to an upgrade of the control program,
wherein the controller controls the menu generating part to display the menu on the display part.

6. The display apparatus according to claim 5, wherein if information related to an upgrade state of the control program and explanation of the upgrade control program is received from the upgrade server, the controller controls the menu generating part to display the menu including a first menu item related to the received information.

7. The display apparatus according to claim 1, wherein the controller stores state information related to an operation state of the display apparatus in the storing part.

8. The display apparatus according to claim 7, wherein if result information that analyzes the state information is received through the communication part, the controller controls the menu generating part to display the menu further including a second menu item related to the received result information on the display part.

9. The display apparatus according to claim 7, wherein the state information and the upgrade information related to the control program are transmitted together to the upgrade server.

10. The display apparatus according to claim 1, wherein the upgrade information comprises information related to at least one of a model name and a serial number of the display apparatus, and information related to the upgrade state of the control program stored in the storing part.

11. The display apparatus according to claim 1, wherein the communication part comprises a USB (Universal Serial Bus) port.

12. A method of upgrading a control program for a display apparatus, the method comprising:
checking whether to connect a portable communication apparatus that is accessible to an upgrade server, to a display apparatus;
transmitting upgrade information related to a control program stored in the display apparatus storing the control program, from the display apparatus to the upgrade server, through the portable communication apparatus connected to the display apparatus; and
receiving an upgrade control program transmitted from the upgrade server to the display apparatus through the portable communication apparatus.

13. The method according to claim 12, further comprising upgrading the control program stored in the display apparatus by replacing it with the upgrade control program.

14. The method according to claim 12, further comprising receiving a user input,
wherein the transmitting upgrade information related to the control program is performed according to the received user input.

15. The method according to claim 12, further comprising displaying a menu related to an upgrade of the control program.

16. The method according to claim 15, wherein if information related to the upgrade state of the control program and explanation of upgraded control program is received from the upgrade server, the displaying the menu comprises displaying the menu including a first menu item related to the received information.

17. The method according to claim 12, further comprising storing state information related to an operation state of the display apparatus in the storing part.

18. The method according to claim 17, further comprising receiving result information that analyzes the state information from the upgrade server through the communication part, and
displaying the menu further including a second menu item related to the received result information on the display part.

19. The method according to claim 17, wherein the state information and the upgrade information related to the control program are transmitted together to the upgrade server.

20. The method according to claim 12, wherein the upgrade information comprises information related to at least one of a model name and a serial number of the display apparatus, and information related to the upgrade state of the control program stored in the storing part.

21. The method according to claim 12, wherein the display apparatus comprises a storing part for storing the control program and an upgrade state of the control program.

22. An image apparatus, comprising:
an image processing part which processes an image signal;
a display part which displays an image corresponding to the image signal;
a storing part which stores a control program and update information related to the control program;
a communication part which performs a data communication with a portable communication apparatus that is accessible to an upgrade server; and
a controller which controls the image processing part to display the image corresponding to the image signal based on the control program, and controls the communication part to transmit the upgrade information related to the control program stored in the storing part to the upgrade server through the portable communication apparatus, and to receive the upgraded control program through the portable communication apparatus.

23. A non-transitory computer-readable recording medium storing a program for upgrading control program for a display apparatus comprising a storing part that stores the control program and an upgrade state of the control program, the program comprising:
a first set of instructions for checking whether to connect a portable communication apparatus that is accessible to an upgrade server, to a display apparatus;
a second set of instructions for transmitting upgrade information related to a control program stored in the display apparatus, from the display apparatus to the upgrade server, through the portable communication apparatus connected to the display apparatus; and
a third set of instructions for receiving an upgrade control program transmitted from the upgrade server to the display apparatus through the portable communication apparatus.

24. A computer implemented method for upgrading a control program for a display apparatus comprising a storing part that stores the control program and an upgrade state of the control program, the method comprising:
checking whether to connect a portable communication apparatus that is accessible to an upgrade server, to a display apparatus;
transmitting upgrade information related to a control program stored in the display apparatus, from the display apparatus to the upgrade server, through the portable communication apparatus connected to the display apparatus; and
receiving an upgrade control program transmitted from the upgrade server to the display apparatus through the portable communication apparatus.

* * * * *